United States Patent
Wu (10) Patent No.: US 10,184,233 B2
(45) Date of Patent: Jan. 22, 2019

(54) AERATOR WITH LED

(71) Applicant: Gary Wu, Homei Township, ChangHua County (TW)

(72) Inventor: Gary Wu, Homei Township, ChangHua County (TW)

( * ) Notice: Subject to any disclaimer, the term of this patent is extended or adjusted under 35 U.S.C. 154(b) by 120 days.

(21) Appl. No.: 15/249,466

(22) Filed: Aug. 28, 2016

(65) Prior Publication Data

US 2018/0058050 A1 Mar. 1, 2018

(51) Int. Cl.
| | | |
|---|---|---|
| *E03C 1/084* | (2006.01) | |
| *F21S 9/04* | (2006.01) | |
| *E03C 1/04* | (2006.01) | |
| *F21V 33/00* | (2006.01) | |
| *G01F 15/06* | (2006.01) | |
| *F21Y 115/10* | (2016.01) | |
| *B05B 1/18* | (2006.01) | |
| *B05B 1/22* | (2006.01) | |

(52) U.S. Cl.
CPC ............ *E03C 1/084* (2013.01); *E03C 1/0404* (2013.01); *F21S 9/046* (2013.01); *F21V 33/004* (2013.01); *G01F 15/06* (2013.01); *B05B 1/18* (2013.01); *B05B 1/185* (2013.01); *B05B 1/22* (2013.01); *F21Y 2115/10* (2016.08)

(58) Field of Classification Search
CPC ......... B05B 7/0425; B05B 1/18; B05B 1/185; B05B 1/22; E03C 1/084; F21Y 115/10
USPC ................................ 239/428.5; 137/801, 603
See application file for complete search history.

(56) References Cited

U.S. PATENT DOCUMENTS

| | | | | | |
|---|---|---|---|---|---|
| 2,541,854 | A | * | 2/1951 | Bachli ..................... | E03C 1/084 235/70 B |
| 3,684,191 | A | * | 8/1972 | Shames ................... | E03C 1/084 239/428.5 |
| 3,801,019 | A | * | 4/1974 | Trenary ................ | B05B 1/1636 239/381 |
| 4,303,201 | A | * | 12/1981 | Elkins ................... | B05B 1/1636 239/381 |
| 4,346,844 | A | * | 8/1982 | Harmony .............. | B05B 1/1636 239/381 |
| 4,588,130 | A | * | 5/1986 | Trenary ................ | B05B 1/1636 239/381 |
| 5,316,216 | A | * | 5/1994 | Cammack ............. | B05B 1/1636 239/381 |
| 6,513,731 | B2 | * | 2/2003 | Griffin .................... | E03C 1/084 239/394 |

(Continued)

*Primary Examiner* — Jason Boeckmann
*Assistant Examiner* — Joseph A Greenlund (57) ABSTRACT

An aerator with an LED has: a case, a water fairing member and a throttle ring. The case further has a generator with a rotator. The water fairing member is disposed in the case through the inlet, the water fairing member has an annular slot facing the inlet of the case, a plurality of inlet apertures are disposed at a bottom of the annular slot. The water fairing member has a containment space facing the generator, and the containment space covers the rotator of the generator. The containment space has a plurality of outlet apertures, and the inlet apertures face a center of the water fairing member and helically connected to the outlet apertures. The inlet apertures taper towards the outlet apertures. The throttle ring is disposed in the annular slot of the water fairing member, and the throttle ring is adjacent to an inner edge of the annular slot.

8 Claims, 7 Drawing Sheets

(56) References Cited

U.S. PATENT DOCUMENTS

| | | | | |
|---|---|---|---|---|
| 6,786,429 | B2 * | 9/2004 | Ouyoung | E03C 1/08 239/390 |
| 6,805,458 | B2 * | 10/2004 | Schindler | E03C 1/0412 239/18 |
| 6,991,362 | B1 * | 1/2006 | Seaman | B01F 5/0218 239/240 |
| 7,252,248 | B2 * | 8/2007 | Cutler | E03C 1/0404 137/309 |
| 7,322,535 | B2 * | 1/2008 | Erdely | B05B 1/1654 239/391 |
| 7,374,366 | B2 * | 5/2008 | Tasi | E03C 1/084 210/456 |
| 7,434,960 | B2 * | 10/2008 | Stuhlmacher, II | E03C 1/04 239/18 |
| 7,584,906 | B2 * | 9/2009 | Lev | B05B 1/18 239/222.15 |
| 7,896,259 | B2 * | 3/2011 | Meisner | B05B 1/1645 239/383 |
| 8,109,449 | B2 * | 2/2012 | Weis | E03C 1/08 239/428.5 |
| 8,800,892 | B2 * | 8/2014 | Prenzler | E03C 1/08 239/428.5 |
| 8,950,435 | B2 * | 2/2015 | Lin | E03C 1/084 138/44 |
| 9,004,290 | B2 * | 4/2015 | Tanner | C02F 1/003 137/603 |
| 9,033,260 | B2 * | 5/2015 | Takano | B05B 7/0425 239/428.5 |
| 9,068,329 | B2 * | 6/2015 | Gransow | B05B 1/16 |
| 9,114,414 | B2 * | 8/2015 | Stein | E03C 1/084 |
| 9,139,988 | B2 * | 9/2015 | Lin | E03C 1/084 |
| 9,249,564 | B2 * | 2/2016 | Zoller | E03C 1/084 |
| 9,303,393 | B2 * | 4/2016 | Bush | E03C 1/084 |
| 9,435,108 | B2 * | 9/2016 | Zhou | E03C 1/08 |
| 2006/0283973 | A1 * | 12/2006 | Bean, Jr. | B05B 1/185 239/70 |
| 2007/0044850 | A1 * | 3/2007 | Pieters | F16K 11/0787 137/597 |
| 2011/0068192 | A1 * | 3/2011 | Klicpera | B05B 12/004 239/74 |
| 2011/0139256 | A1 * | 6/2011 | Maercovich | E03C 1/055 137/1 |
| 2011/0186154 | A1 * | 8/2011 | Klicpera | B67D 7/08 137/551 |
| 2012/0024984 | A1 * | 2/2012 | Takano | E03C 1/084 239/428.5 |
| 2012/0266983 | A1 * | 10/2012 | Tsai | E03C 1/046 137/801 |
| 2012/0311777 | A1 * | 12/2012 | Le | A61H 33/027 4/541.6 |
| 2014/0116553 | A1 * | 5/2014 | Schoolcraft | E03C 1/057 137/801 |
| 2017/0306597 | A1 * | 10/2017 | Wu | E03C 1/084 |
| 2017/0336235 | A1 * | 11/2017 | Riddick | G01F 15/075 |

* cited by examiner

AERATOR WITH LED

BACKGROUND OF THE INVENTION

1. Field of the Invention

The present invention relates to an aerator, and more particularly to an aerator with an LED.

2. Description of the Related Art

3. Currently, according to the California Energy Commission's new Saving Act (California new water limiting regulations), all current faucet devices need to reduce water consumption. The goal is in the first yea, it is expected to save 10.3 billion gallons of water. For example: (1) The flow rate of faucets in each household bathroom should not exceed 1.2 gallons per minute. The flow rate in the previous provision is 2.2 gallons. (2) The flow rate of faucets in public bathrooms cannot exceed 0.5 gallons per minute. (3) The flow rate of faucets in kitchens must be less than 1.8-2.2 gallons per. (4) No more than 1.28 gallons each flash, and the waste cannot be less then 350 g. A traditional aerator with an LED allows water to directly impact the generator in the aerator. However, with the new regulations, not enough water impacts the generator of the tradition aerator with an LED such that LED might start blanking or illuminate very weak.

Therefore, it is desirable to provide an aerator with an LED to mitigate and/or obviate the aforementioned problems.

SUMMARY OF THE INVENTION

An objective of the present invention is to provide an aerator with an LED.

In order to achieve the above mentioned objective, an aerator with an LED has: a case, a water fairing member and a throttle ring. The case further has a generator with a rotator facing the inlet, and the generator is configured to power an LED. The water fairing member is disposed in the case through the inlet, the water fairing member has an annular slot facing the inlet of the case, a plurality of inlet apertures are disposed at a bottom of the annular slot. The water fairing member further has a containment space facing the generator, and the containment space covers the rotator of the generator. The containment space has a plurality of outlet apertures, and the inlet apertures face a center of the water fairing member and helically connected to the outlet apertures. The inlet apertures taper towards the outlet apertures to cause interaction with the rotator to drive the generator. The throttle ring is disposed in the annular slot of the water fairing member, and the throttle ring is adjacent to an inner edge of the annular slot.

The case further comprises a cover covering the spout and an outlet plate fixed onto the cover.

The generator further comprises a plurality protrusions around the rotator; the water fairing member further comprises a plurality of slots around the containment space, and the slots of the water fairing member are jacketed onto the protrusion of the generator.

The water fairing member further comprises a positioning loop around the annular slot, the positioning loop connected to a diverter mask, and the diverter mask comprises a plurality of filling apertures.

The case further comprises a sealing ring fixed onto the inlet, and the sealing ring presses against the diverter mask.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
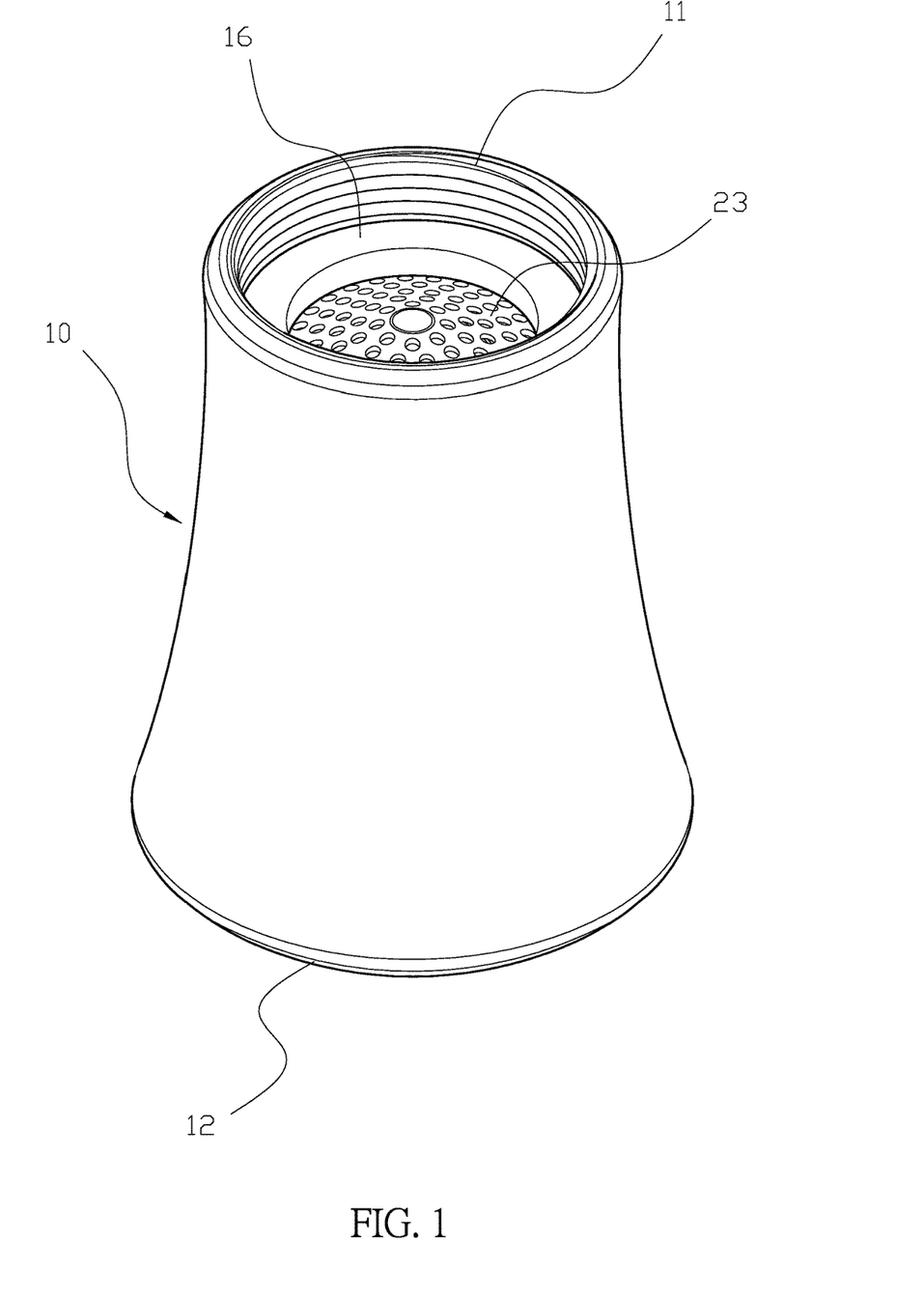
FIG. 1 is a perspective of a preferred embodiment of the present invention.
Figure 2:
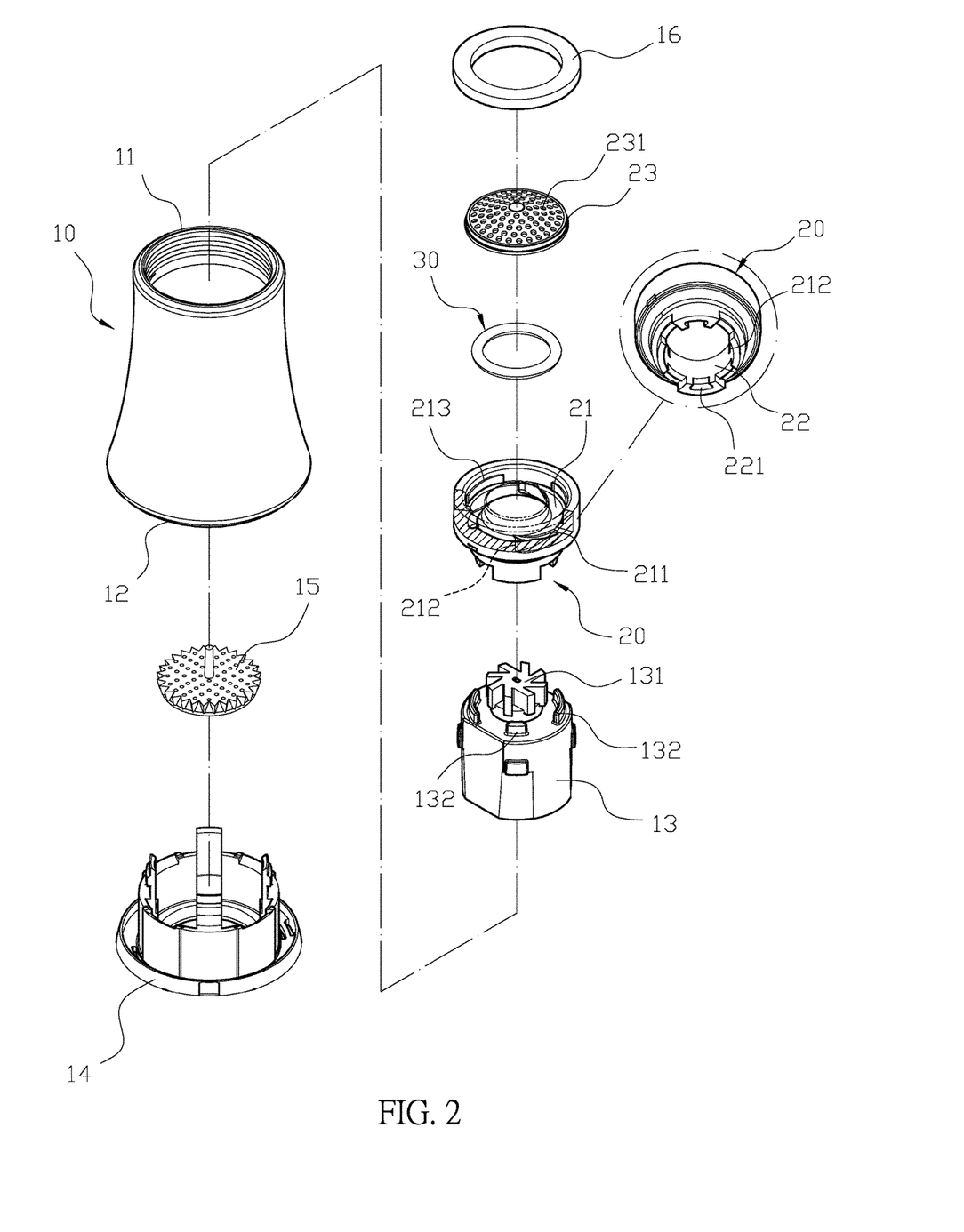
FIG. 2 is an exploded drawing of the preferred embodiment of the present invention.
Figure 3:
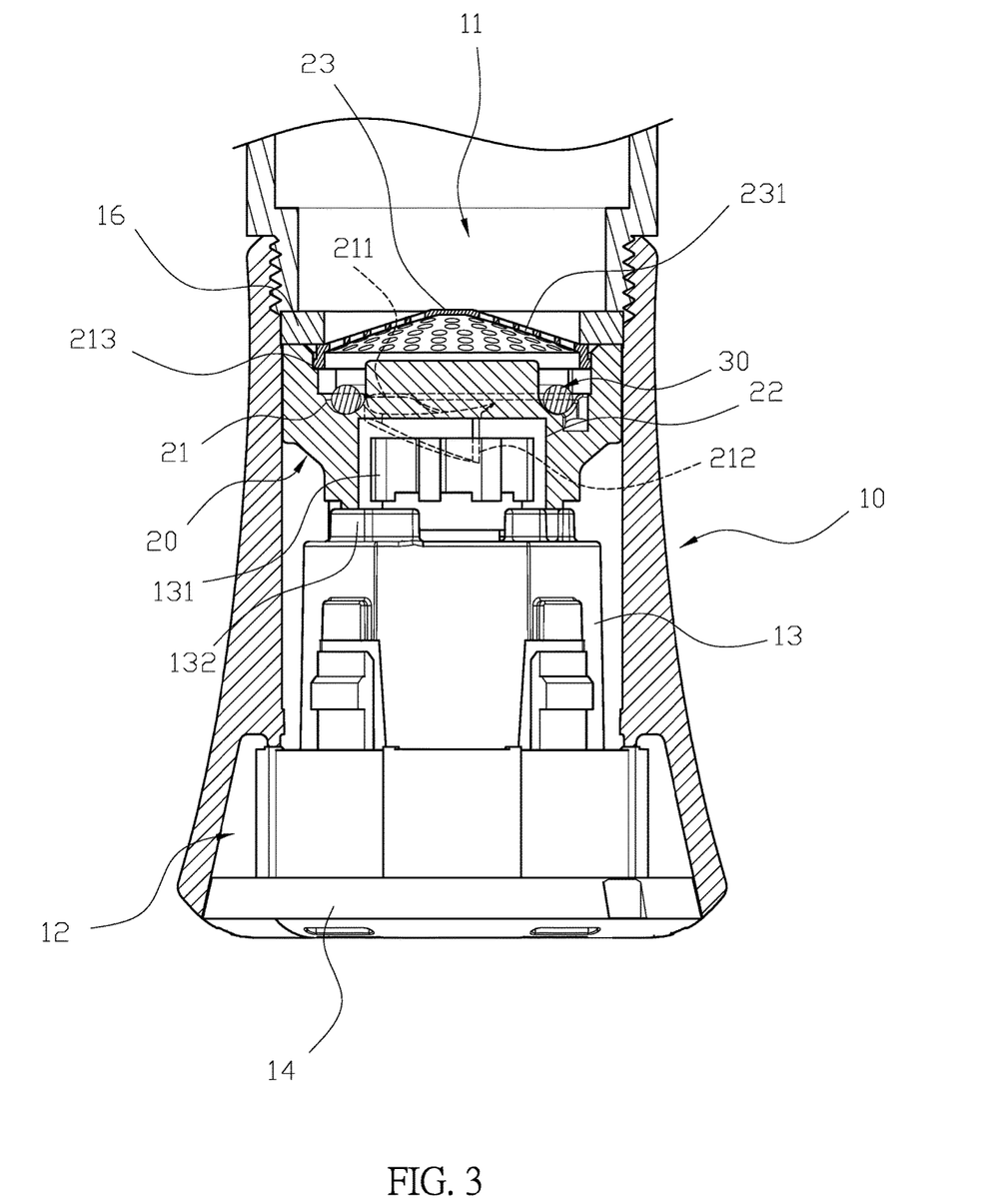
FIG. 3 is a cross-sectional drawing of the preferred embodiment of the present invention.
Figure 4:
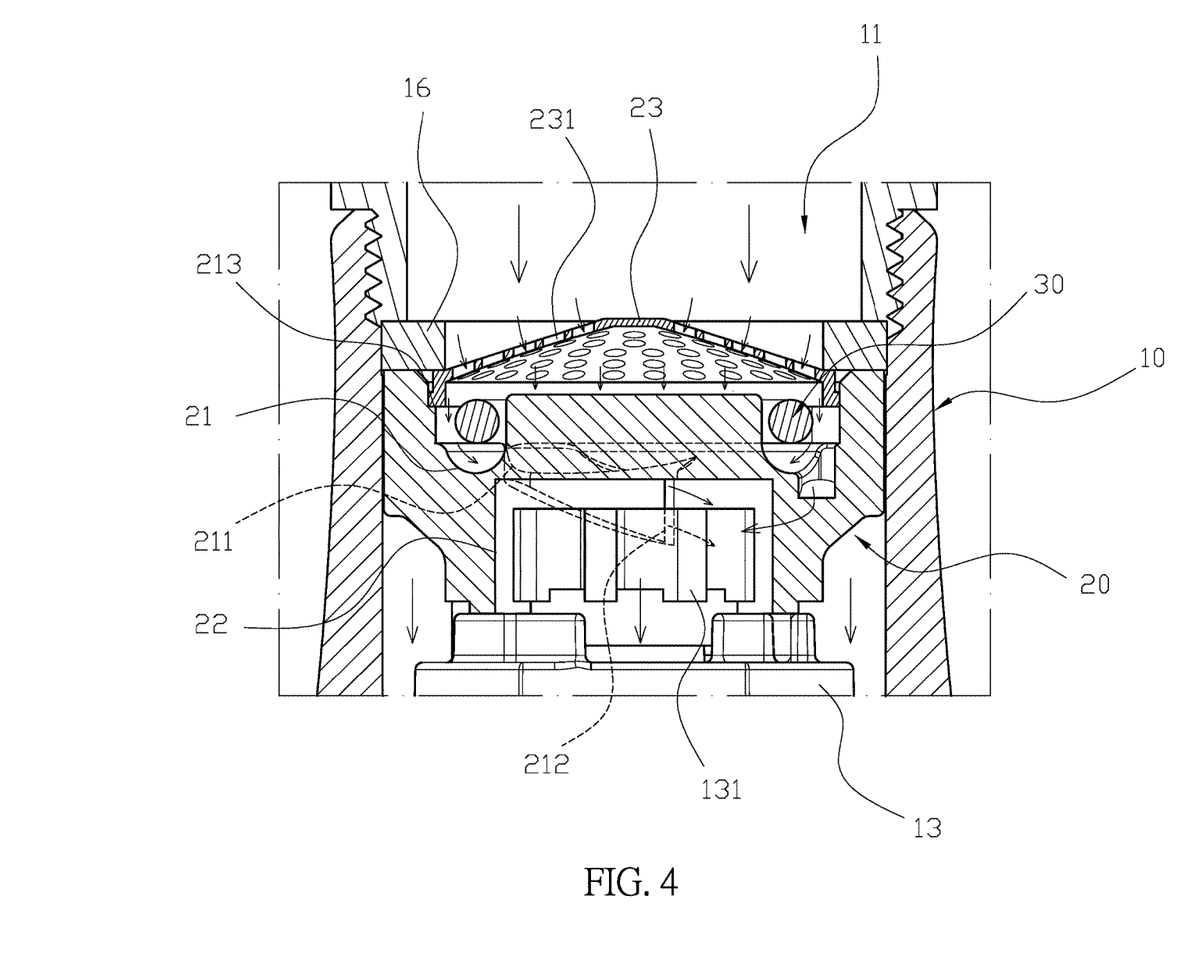
FIG. 4 is a schematic drawing of the preferred embodiment of the present invention.
Figure 5:
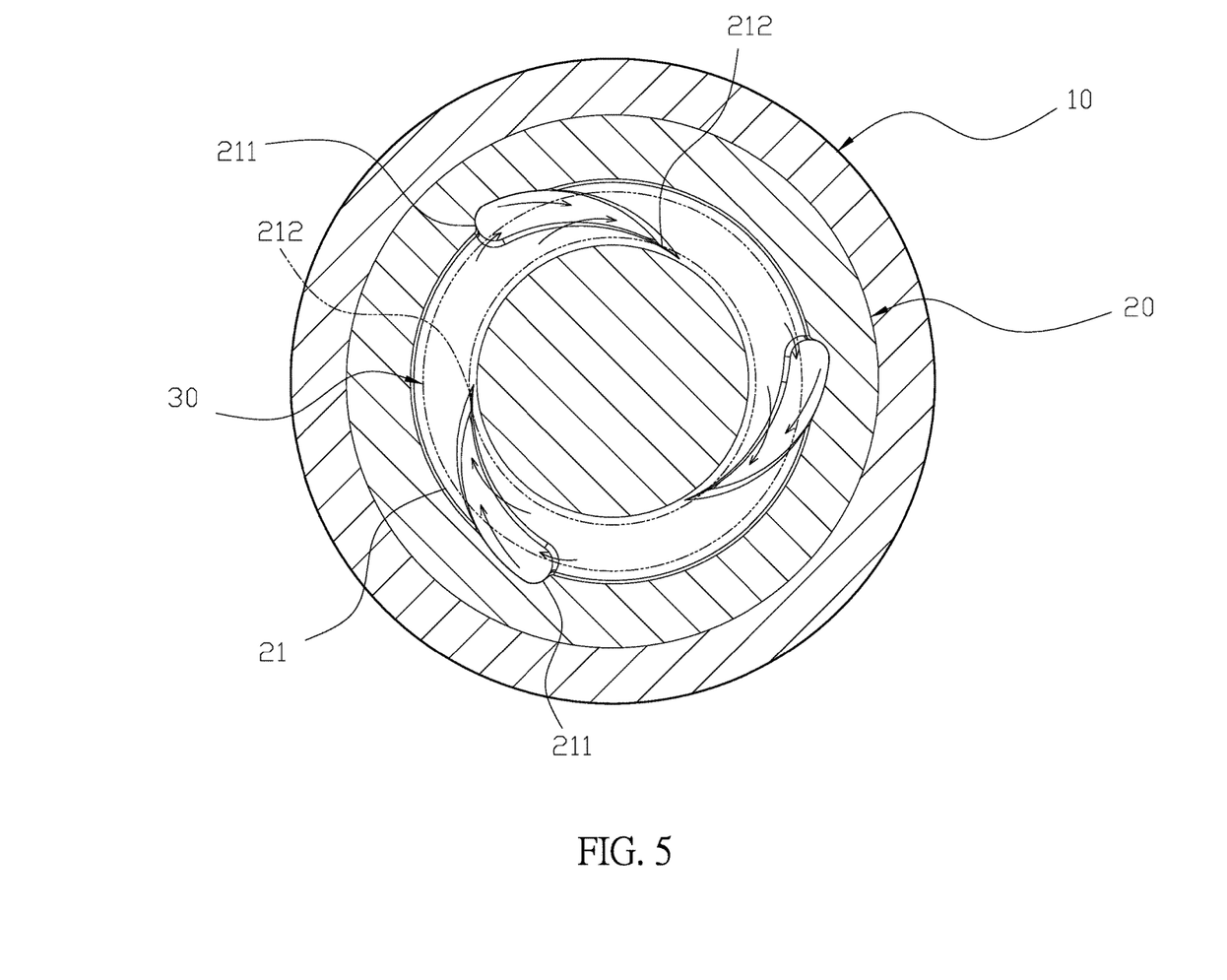
FIG. 5 is another schematic drawing of the preferred embodiment of the present invention.
Figure 6:
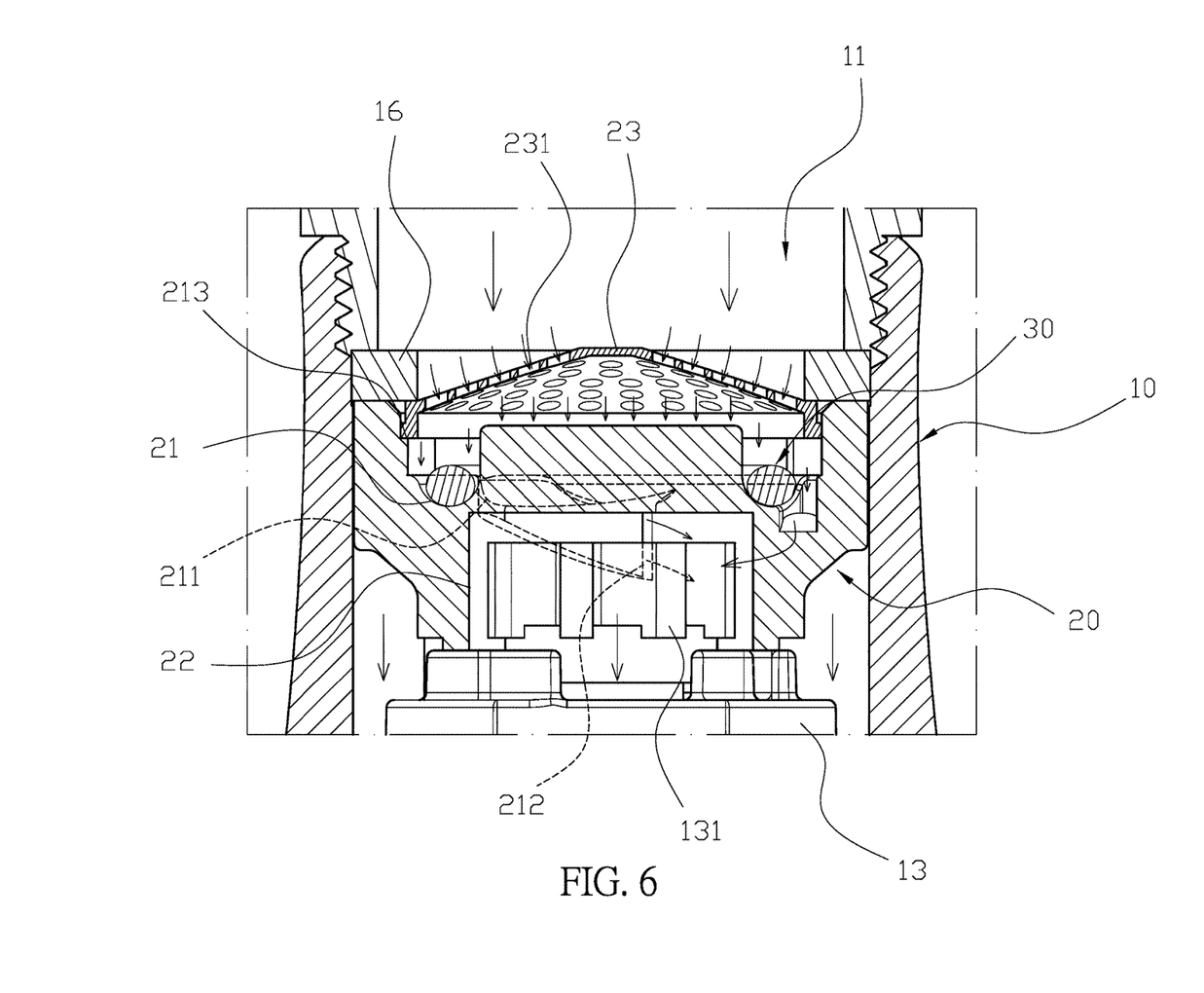
FIG. 6 is another schematic drawing of the preferred embodiment of the present invention.
Figure 7:
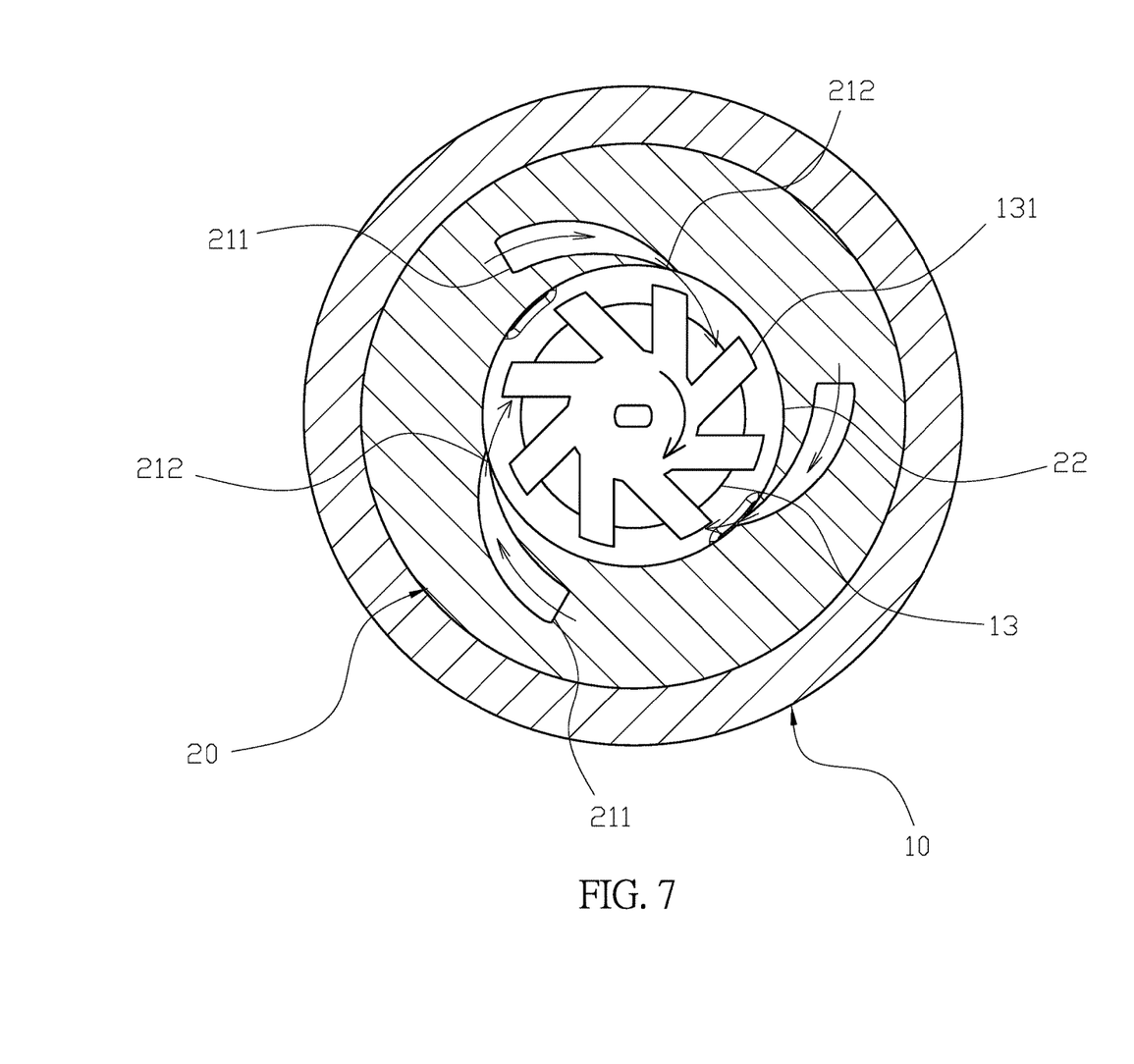
FIG. 7 is another schematic drawing of the preferred embodiment of the present invention.

Please refer to FIG. 1 to FIG. 3. An aerator with an LED comprises a case 10, a water fairing member 20 and a throttle ring 30. The case 10 has an inlet 11 at one end, a spout 12 at another end, and a generator 13. The generator 13 has a rotator 131 facing the inlet 11, and the generator 13 is configured to power an LED. The case 10 further has a cover 14 covering the spout 12 and an outlet plate 15 fixed onto the cover 14. The generator 13 further has a plurality protrusions 132 around the rotator 131. The water fairing member 20 is disposed in the case 10 through the inlet 11 and an annular slot 21 facing the inlet 11 of the case 10. A plurality of inlet apertures 211 are disposed at a bottom of the annular slot 21. The water fairing member 20 further has a containment space 22 facing the generator 13, and the containment space 22 coves the rotator 131 of the generator 13. The water fairing member 20 further has a plurality of slots 221 around the containment space 22, and the slots 221 of the water fairing member 20 is jacketed onto the protrusion 132 of the generator 13. The containment space 22 has a plurality of outlet apertures 212, the inlet apertures 211 face a center of the water fairing member 20 and are helically connected to the outlet apertures 212. The inlet apertures 211 taper toward to the outlet apertures 212 to cause interaction with the rotator 131 to drive the generator 13. The throttle ring 30 is disposed in the annular slot 21 of the water fairing member 20, and the throttle ring 30 is adjacent to an inner edge of the annular slot 20 and subject to deform under high water pressure to increase a blocking surface against the inlet aperture 211. Furthermore, the water fairing member 20 further comprises a positioning loop 213 around the annular slot 21, the positioning loop 213 is connected to a diverter mask 23, and the diverter mask 23 comprises a plurality of filling apertures 231. Moreover, the case 10 case further comprises a sealing ring 16 fixed onto the inlet 11, and the sealing ring 16 presses against the diverter mask 23 to seal between the case 10 and the water fairing member 20.

For assembly, please refer to FIG. to FIG. 3 again. The cover 14 is assembled with the outlet plate 15 which is attached with the generator 13, and the rotator 131 of the generator 13 is disposed in the spout 12 of the case 10 such that the generator 13 is contained in the case 10. The cover 14 is fixed onto the spout 12 of the case 10, the rotator 131 of the generator 13 faces the inlet 11 of the case 10, and the water fairing member 20 is placed into the case 10 through the inlet 11. Therefore, the containment space 22 of the water fairing member 20 covers the rotator 131, the slot 221 of the water fairing member 20 is aligned with the protrusion 132 of the generator 13. Afterward, an anti-rotation positioning is formed between the generator 13 and the water fairing member 20, and the outlet aperture 212 of the water fairing member 20 is positioned adjacent to the rotator 131. Moreover, the throttle ring 30 is placed in the annular slot 21 of the water fairing member 20, and the diverter mask 23 covers the water fairing member 20 and pushes against the positioning loop 213. Finally, the sealing ring 16 is disposed between the inlet 11 of the case 10 and the water fairing member 20.

For actual result, please refer to FIG. 4-FIG. 7 with FIG. 2. Water first flows through the filling aperture 231 of the diverter mask 23 to become more even shower onto the annular slot 21 of the water fairing member 20, then it enters through the inlet aperture 211 of the annular slot 21 and flows along the inlet aperture 211 and the outlet aperture 212 downwardly with higher speed due to tapered apertures, to impact the rotator 131 of the generator 13. Therefore, less water can steadily drive the rotator 131 of the generator 13 to generated electricity and still obeys the California Energy Commission's new Saving Act (California new water limiting regulations 1.2). After water drives the rotator 131 and passes by the generator 13, it exits through the outlet plate 15. For further explanation, with the throttle ring 30 disposed in the annular slot 21 of the water fairing member 20, when the water pressure is increased, the flow pushes to deform the throttle ring 30, such that the throttle ring 30 can increase its blocking surface against the inlet aperture 211 to efficiently reduce water output. Conversely, when the water pressure is reduced, the throttle ring 30 is less deformed, and more water flows through the inlet aperture 211.

Although the present invention has been explained in relation to its preferred embodiment, it is to be understood that many other possible modifications and variations can be made without departing from the spirit and scope of the invention as hereinafter claimed.

What is claimed is:

1. An aerator with a light emitting diode (LED) comprising:
   a case having an inlet at one end and a spout at another end, the case further having a generator with a rotator facing the inlet, the generator configured to power an LED;
   a water fairing member disposed in the case through the inlet, the water fairing member having an annular slot facing the inlet of the case, a plurality of inlet apertures disposed at a bottom of the annular slot; the water fairing member further having a containment space facing the generator, the containment space covering the rotator of the generator; the containment space having a plurality of outlet apertures, the inlet apertures facing a center of the water fairing member and helically connected to the outlet apertures, the inlet apertures tapering towards the outlet apertures to cause interaction with the rotator to drive the generator; and
   a throttle ring disposed in the annular slot of the water fairing member, the throttle ring being adjacent to an inner edge of the annular slot;
   wherein the generator further comprises a plurality of protrusions around the rotator; and
   the water fairing member further comprises a plurality of slots around the containment space, and the slots of the water fairing member are jacketed onto the protrusion of the generator.

2. The aerator with an LED as claimed in claim 1, wherein the case further comprises a cover covering the spout and an outlet plate fixed onto the cover.

3. An aerator with a light emitting diode (LED) comprising:
   a case having an inlet at one end and a spout at another end, the case further having a generator with a rotator facing the inlet, the generator configured to power an LED;
   a water fairing member disposed in the case through the inlet, the water fairing member having an annular slot facing the inlet of the case, a plurality of inlet apertures disposed at a bottom of the annular slot the water fairing member further having a containment space facing the generator, the containment space covering the rotator of the generator; the containment space having a plurality of outlet apertures, the inlet apertures facing a center of the water fairing member and helically connected to the outlet apertures, the inlet apertures tapering towards the outlet apertures to cause interaction with the rotator to drive the generator; and
   a throttle ring disposed in the annular slot of the water fairing member, the throttle ring being adjacent to an inner edge of the annular slot;
   wherein the water fairing member further comprises a positioning loop around the annular slot, the positioning loop connected to a diverter mask, and the diverter mask comprises a plurality of filling apertures.

4. The aerator with an LED as claimed in claim 3 wherein the case further comprises a sealing ring fixed onto the inlet, and the sealing ring presses against the diverter mask.

5. The aerator with an LED as claimed in claim 3, wherein the case further comprises a cover covering the spout and an outlet plate fixed onto the cover.

6. The aerator with an LED as claimed in claim 3, wherein the generator further comprises a plurality of protrusions around the rotator, the water fairing member further comprises a plurality of slots around the containment space, and the slots of the water fairing member are jacketed onto the protrusion of the generator.

7. The aerator with an LED as claimed in claim 1, wherein the water fairing member further comprises a positioning loop around the annular slot, the positioning loop connected to a diverter mask, and the diverter mask comprises a plurality of filling apertures.

8. The aerator with an LED as claimed in claim 7, wherein the case further comprises a sealing ring fixed onto the inlet, and the sealing ring presses against the diverter mask.

* * * * *